United States Patent [19]
Breed

[11] Patent Number: 5,842,716
[45] Date of Patent: *Dec. 1, 1998

[54] SELF CONTAINED SIDE IMPACT AIRBAG SYSTEM

[75] Inventor: David S. Breed, Boonton Township, N.J.

[73] Assignee: Automotive Technologies International, Inc., Boonton Twp., N.J.

[ * ] Notice: The term of this patent shall not extend beyond the expiration date of Pat. No. 5,231,253.

[21] Appl. No.: 101,017

[22] Filed: Sep. 16, 1993

Related U.S. Application Data

[63] Continuation-in-part of Ser. No. 727,757, Jul. 9, 1991, Pat. No. 5,233,141, and Ser. No. 896,496, Jun. 2, 1992, Pat. No. 5,231,253, which is a continuation-in-part of Ser. No. 480,273, Feb. 15, 1990, which is a continuation-in-part of Ser. No. 314,603, Feb. 23, 1989, abandoned, said Ser. No. 727,757, is a continuation-in-part of Ser. No. 686,717, Apr. 17, 1991, abandoned, which is a continuation-in-part of Ser. No. 314,603.

[51] Int. Cl.⁶ .................................................. B60R 21/32
[52] U.S. Cl. ..................... 280/734; 280/730.2; 280/731
[58] Field of Search ........................... 280/728 A, 730 A, 280/731, 728 R, 734, 741; 180/274; 200/61.45 R, 61.46, 61.48, 61.49

[56] References Cited

U.S. PATENT DOCUMENTS

| | | | |
|---|---|---|---|
| 2,369,977 | 2/1945 | O'Toole | 200/61.51 |
| 2,806,737 | 9/1957 | Maxwell | 280/734 |
| 2,816,188 | 12/1957 | Stout | 200/61.48 |
| 3,097,272 | 7/1963 | Hautly | 200/61.49 |
| 3,488,462 | 1/1970 | Gianotto | 200/61.45 R |
| 3,790,727 | 2/1974 | Laserson et al. | 200/61.49 |
| 3,791,667 | 2/1974 | Haviland | 280/730.2 |
| 3,835,273 | 9/1974 | Stolarik | 200/61.48 |
| 3,861,712 | 1/1975 | Matsui et al. | 280/739 |
| 3,884,499 | 5/1975 | Oka et al. | 280/739 |
| 3,974,350 | 8/1976 | Breed | 200/61.53 |
| 3,981,520 | 9/1976 | Pulling | 280/730.2 |
| 4,321,438 | 3/1982 | Emenegger | 200/61.53 X |
| 4,329,549 | 5/1982 | Breed | 200/61.53 X |
| 4,362,913 | 12/1982 | Kumita et al. | 200/61.48 X |
| 4,370,930 | 2/1983 | Strasser et al. | 280/741 |
| 4,580,810 | 4/1986 | Thuen et al. | 280/734 |
| 4,666,182 | 5/1987 | Breed et al. | 280/734 |
| 4,711,466 | 12/1987 | Breed | 280/741 |
| 4,816,627 | 3/1989 | Janotik | 200/61.53 X |
| 5,010,216 | 4/1991 | Sewell et al. | 200/61.45 M |
| 5,011,181 | 4/1991 | Laucht et al. | 280/731 |
| 5,049,475 | 9/1991 | Olsson et al. | 280/730.2 |
| 5,069,479 | 12/1991 | Koide | 280/734 |
| 5,072,966 | 12/1991 | Nishitake et al. | 180/274 |
| 5,231,253 | 7/1993 | Breed et al. | 200/61.45 R |
| 5,233,141 | 8/1993 | Breed | 200/61.45 R |

*Primary Examiner*—Eric D. Culbreth
*Attorney, Agent, or Firm*—Samuel Shipkovit

[57] ABSTRACT

This invention is primarily related to a side impact self contained airbag system for a vehicle including a sensor, an inflator, an airbag and, when appropriate, a diagnostic and energy reserve module all within one package. In some implementations, a non-sodium azide propellant is used and the gas in exhausted from the airbag into the door during the accident rather than into the passenger compartment. The preferred implementation uses an all mechanical system but electro-mechanical and electronic sensors can also be used. Several of the improvements disclosed are also applicable for frontal impact airbag systems. A combination of crush sensing and velocity sensing is also disclosed for the all mechanical system.

4 Claims, 19 Drawing Sheets

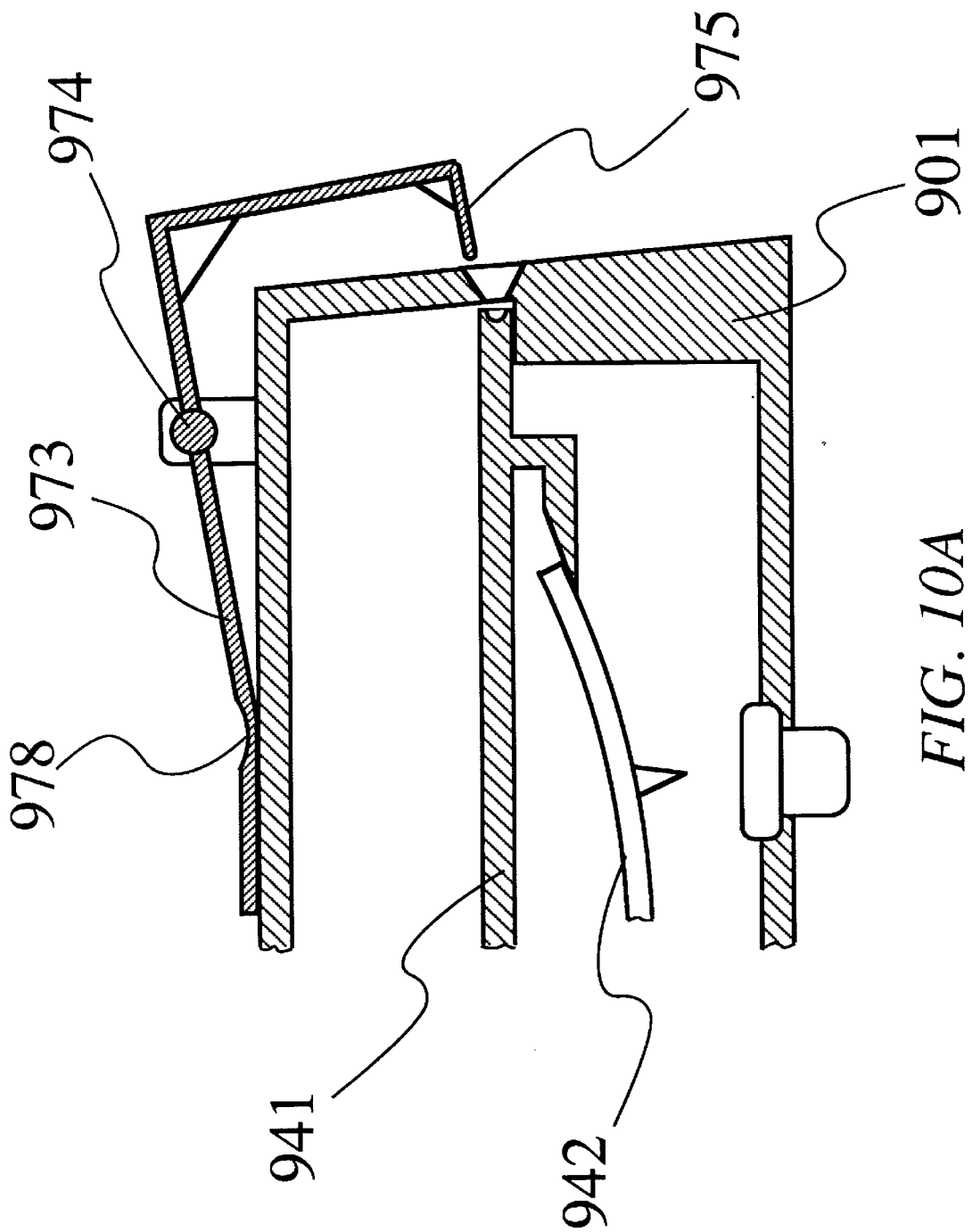

SELF CONTAINED SIDE IMPACT AIRBAG SYSTEM

CROSS REFERENCE

This application is a continuation-in-part of U.S. patent application Ser. No. 07/727,757 filed Jul. 9, 1991, now U.S. Pat. No. 5,233,141, and a continuation-in-part of U.S. patent application Ser. No. 07/896,496 filed Jun. 2, 1992, now U.S. Pat. No. 5,231,253, both of which are included herein by reference. The '496 application is a continuation-in-part of U.S. patent application Ser. No. 07/480,273 filed Feb. 15, 1990 which in turn is a continuation-in-part of U.S. patent application Ser. No. 07/314,603 filed Feb. 23, 1989, now abandoned. The '757 application is a continuation-in-part of U.S. patent application Ser. No. 07/686,717 filed Apr. 17, 1991 which in turn is a continuation-in-part of U.S. patent application Ser. No. 07/314,603 filed Feb. 23, 1989. For the purpose of the instant application, please note FIG. 1 of the '603 application and specifically the hinged sensing mass.

BACKGROUND OF THE INVENTION

Self contained airbag systems contain all of the parts of the airbag system within a single package, in the case of mechanical implementations, and in the case of electrical or electronic systems, all parts except the primary source of electrical power and, in some cases, the diagnostic system. This includes the sensor, inflator and airbag. Potentially these systems have significant cost and reliability advantages over conventional systems where the sensor(s), diagnostic and backup power supply are mounted separate from the airbag module. In mechanical implementations in particular, all of the wiring, the diagnostic system and backup power supply are eliminated. In spite of these advantages, self contained airbag systems have only achieved limited acceptance for frontal impacts and have so far not been considered for side impacts.

The all mechanical self contained systems were the first to appear on the market for frontal impacts but have not been widely adopted partially due to their sensitivity to accelerations in the vertical and lateral directions. These cross-axis accelerations have been shown to seriously degrade the performance of the most common all mechanical design which is disclosed in Thuen U.S. Pat. No. 4,580,810. Both frontal and side impact crashes frequently have severe cross-axis accelerations.

Additionally, all mechanical self contained airbag systems, such as disclosed in the Thuen patent, require that the sensor be placed inside of the inflator which increases the strength requirements of the inflator walls and thus increases the size and weight of the system. One solution to this problem appears in Breed U.S. Pat. No. 4,711,466 but has not been implemented. This patent discloses a method of initiating an inflator through the use of a percussion primer in combination with a stab primer and the placement of the sensor outside of the inflator. One disadvantage of this system is that a hole must still be placed in the inflator wall to accommodate the percussion primer which has its own housing. This hole weakens the wall of the inflator and also provides a potential path for gas to escape.

Another disadvantage in the Thuen system which makes it unusable for side impacts, is that the arming system is sealed from the environment by an O-ring. This sealing method may perform satisfactorily when the module is mounted in the protected passenger compartment but it would not be satisfactory for side impact cases where the module would be mounted in the vehicle door where it can be subjected to water, salt, dirt, and other harsh environments.

Self contained electrical systems have also not been widely used. When airbags are used for both the driver and the passenger, self contained airbag systems require a separate sensor and diagnostic for each module. In contrast to mechanical systems the electronic sensor and diagnostic systems used by most vehicle manufacturers are expensive. This duplication and associated cost required for electrical systems eliminates most of the advantages of the self contained system.

Sensors located in the passenger compartment of a vehicle can catch most airbag required crashes for frontal impacts, particularly if the occupants are wearing seatbelts. However, researchers now believe that there are a significant number of crashes which cannot be sensed in time in the passenger compartment and that this will require the addition of another sensor mounted in the crush zone (see, for example, Breed, D. S., Sanders, W. T. and Castelli, V. "A Critique of Single Point Sensing", Society of Automotive Engineers Paper No. 920124). If true, this will eventually eliminate the use of self contained airbag systems for frontal impacts.

Some of these problems do not apply to side impacts mainly because side impact sensors must trigger in a very few milliseconds when there is no significant signal at any point in the vehicle except where the car is crushing. Each airbag system must be mounted in the crush zone and generally will have its own sensor. Self contained airbag systems have heretofore not been used for occupant protection for side impacts which is largely due to the misconception that side impact sensing requires the use of elongated switches as is discussed in detail in copending patent application Ser. No. 07/896,496, which is included herein by reference. These elongated prior art side impact crush sensing switches are not readily adaptable to the more compact self contained designs. The realization that a moving mass sensor was the proper method for sensing side impacts has now led to the development of the side impact self contained airbag system of this invention. The theory of sensing side impacts is included in the copending patent application Ser. No. 07/896,496 referenced above.

In electromechanical and electronic self contained modules, the backup power supply and diagnostic system are frequently mounted apart from the airbag system. If a wire is severed during a crash but before the airbag deploys, the system may lose its power and fail to deploy. This is more likely to happen in a side impact where the wires must travel inside of the door. For this reason, mechanical self contained systems have a significant reliability advantage over conventional electrical systems.

Finally, the space available for the mounting of airbag systems in the doors of vehicles is frequently severely limited making it desirable that the airbag module be as small as possible. Conventional gas generators use sodium azide as the gas generating propellant which requires that the gas be cooled and extensively filtered to remove the sodium oxide, a toxic product of combustion. This is because the gas in exhausted into the passenger compartment where it can burn an occupant and is inhaled. If the gas is not permitted to enter the passenger compartment, the temperature of the gas can be higher and the products of combustion can contain toxic chemicals, such as carbon dioxide.

These and other problems associated with self contained airbag systems are solved by the invention disclosed herein.

SUMMARY OF THE INVENTION

This invention is primarily concerned with a novel self contained airbag system for protecting occupants in side impacts. This is accomplished by using the sensors described in copending patent application Ser. No. 07/896,496 referenced above, along with other improvements described in detail below. This invention is secondarily concerned with applying some of the features of the novel side impact system to solving some of the problems of prior art all mechanical airbag systems discussed above.

The sensitivity to cross axis accelerations of current all mechanical airbag systems, for example, is solved in the present invention, as discussed in copending patent application Ser. No. 07/727,757, through the substitution of a hinged sensing element for the ball sensing mass in the Thuen patent.

The problems resulting from the hole in the inflator wall when a percussion primer is used as in Breed U.S. Pat. No. 4,711,466, are solved in the present invention through the placement of sensitive pyrotechnic material in a cavity adjacent to the outside wall of the inflator and then using shock from a stab primer to initiate the pyrotechnic material and thus the inflator. An alternate solution, as discussed below, is to make the size of the hole created in the inflator by the action of the stab primer small so that the total quantity of gas which escapes into the sensor is small compared with the quantity of gas used to inflate the airbag.

Finally, in the self contained airbag system disclosed herein, provision is made to exhaust the gas outside of the passenger compartment, into the vehicle doors, or other side areas of the vehicle. This permits the use of higher gas temperatures and alternate propellant formulations, such as nitro-cellulose, which produce toxic combustion products. Both of these changes reduce the size, weight and cost of the system.

Briefly, the self contained airbag system of this invention consists of a sensor having a movable sensing mass, means to sense the position of the sensing mass to determine if the airbag should be deployed, a sealed housing, a gas generate for producing the gas to inflate the airbag, an airbag, and mounting hardware.

The principal objects and advantages of this invention are:
1. To provide a self contained side impact occupant protection airbag system incorporating the advantages of a movable mass sensor resulting in a low cost, compact airbag system.
2. To provide a frontal impact all mechanical airbag system incorporating a hinged sensing mass to eliminate the effects of cross-axis accelerations on the operation of the sensor i.e., when the sensor housing accelerates in a longitudinal direction, a support structure is detachably coupled to the sensing mass and provides a substantially greater resistance to vertical and lateral forces in directions perpendicular to the longitudinal direction than to longitudinal forces in the longitudinal direction with respect to and on the sensing mass.
3. To provide a method of minimizing the leakage of the inflator gases out of the inflator portion of a self contained airbag system into the sensor portion and the associated problems.
4. To provide a side impact airbag system which utilizes the crush of the vehicle side to arm the sensor and motion of a sensing mass to initiate deployment.
5. To provide a method of hermetically sealing a self contained airbag system while permitting an external force to be used to arm the system.
6. To provide a more compact self contained side impact airbag system by providing for the exhausting of the airbag gas into the vehicle door or side, therefore permitting the use of higher temperature gas and propellants which would otherwise not be viable due to their toxic products.
7. To provide an all mechanical airbag system utilizing a cantilevered firing pin spring which also provides the biasing force on the sensing mass thereby providing a simplified design.
8. To provide an all mechanical airbag system with a thin sensor mounted outside of the inflator housing but in line with it to reduce the size of the system and permit the use of conventional inflator designs.
9. To provide a highly reliable side impact occupant protection electro-mechanical self contained airbag system.
10. To provide a highly reliable side impact occupant protection electronic self contained airbag system.
11. To provide a method of obtaining the power for an electrical self contained airbag system from other components within the door thereby minimizing the requirement for separate wiring for the airbag system.
12. To provide a power supply within the self contained module and a simplified diagnostic system for an electrical self contained airbag system.
13. To provide a self contained airbag system design which permits the arming of the sensor after it has been mounted onto the vehicle but before the inflator is mounted to provide greater safety against unwanted deployments. Other objects and advantages will become apparent from the discussion below.

BRIEF DESCRIPTION OF THE DRAWINGS

FIG. 10A is a blowup with certain parts removed showing a portion of the sensor shown in FIG. 10 in the armed position.

DETAILED DESCRIPTION OF THE PREFERRED EMBODIMENTS

Figure 1:
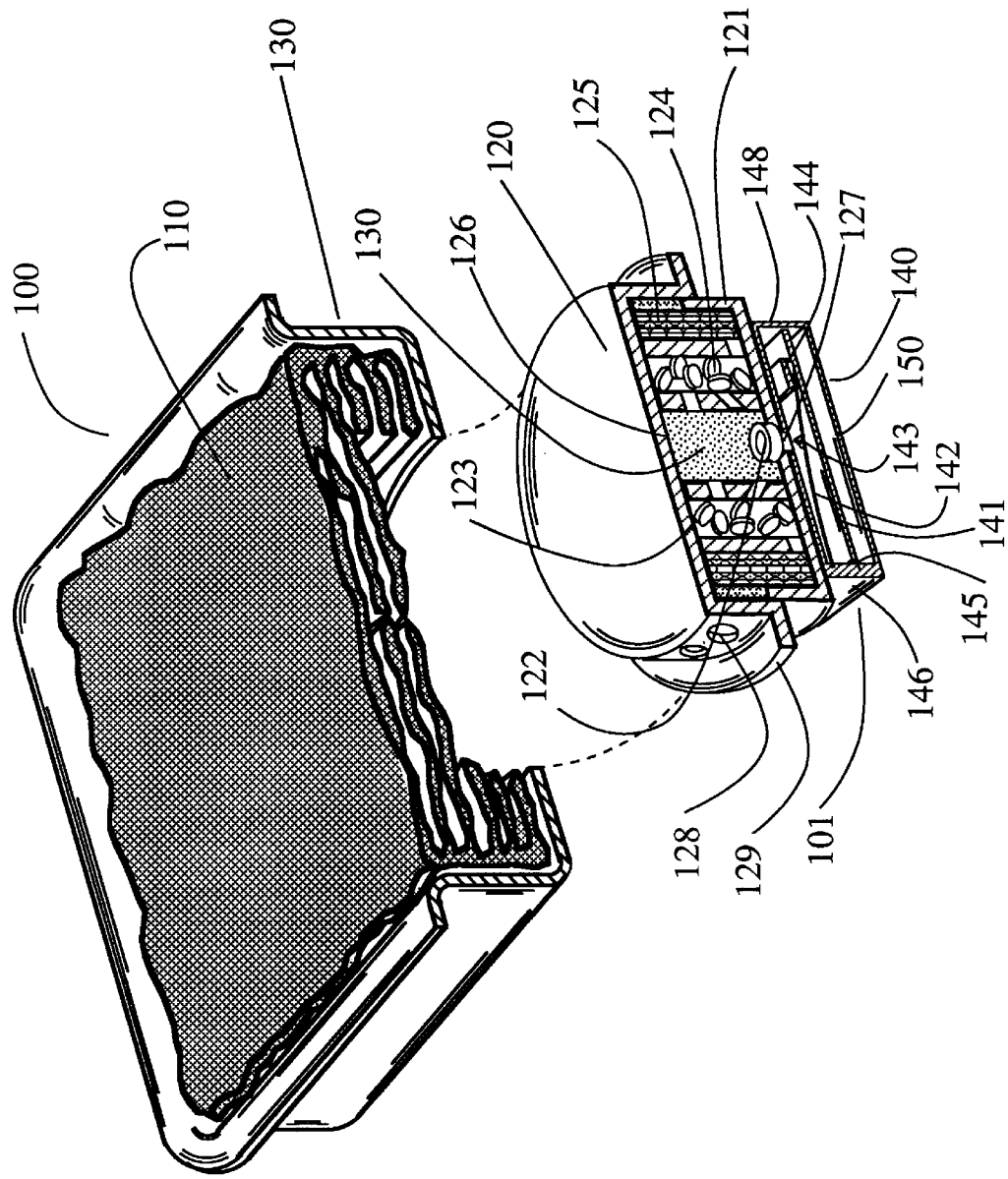
FIG. 1 is a perspective view with certain parts removed of an all mechanical self contained airbag system for mounting on the side of a vehicle to protect occupants in side impacts.
Figure 2:
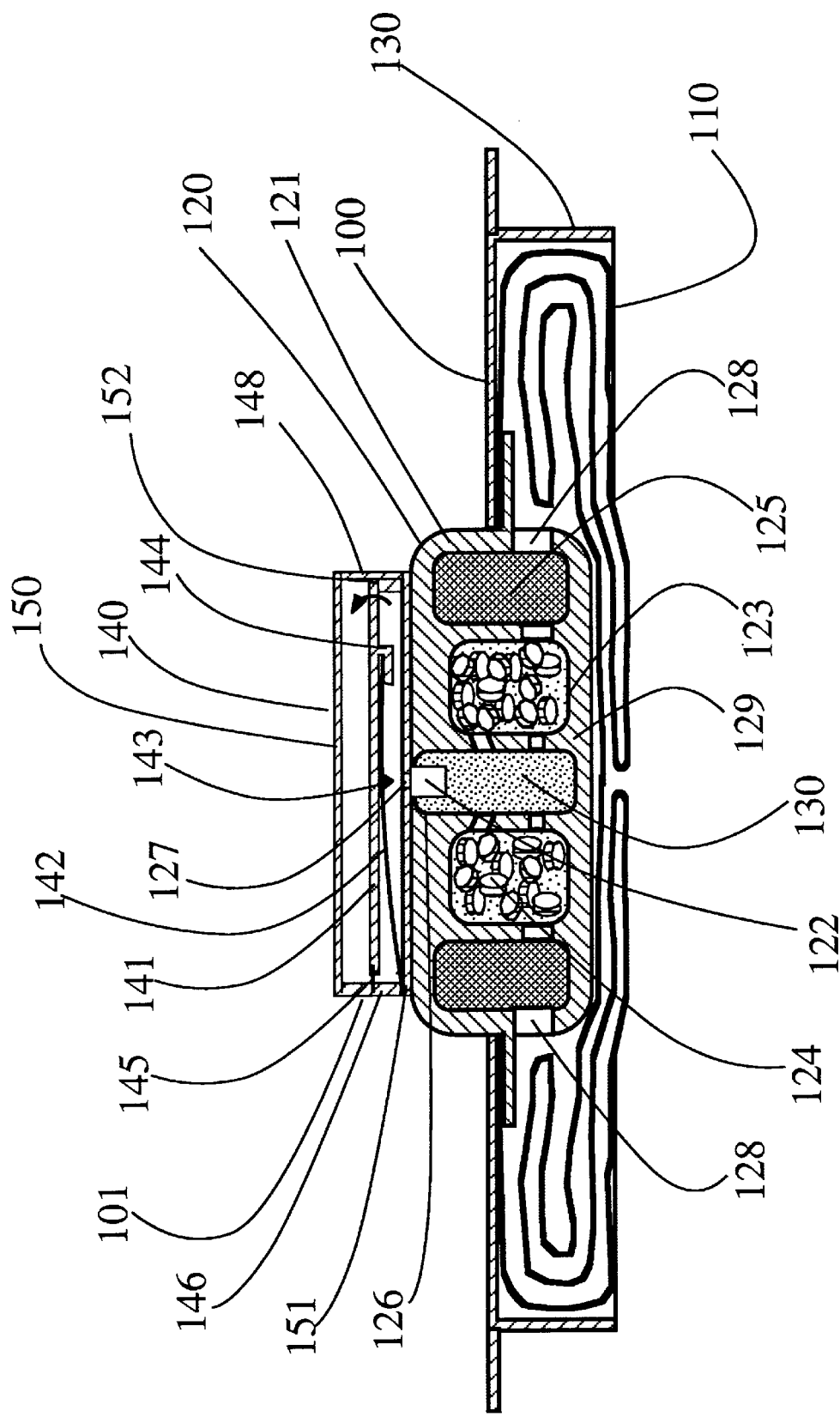
FIG. 2 is a cross sectional view of the apparatus of FIG. 1 taken along lines 2—2.

A perspective view with certain parts removed of an all mechanical self contained airbag system for mounting on the side of a vehicle to protect occupants in side impacts is shown in FIG. 1. FIG. 2 is a cross section view of the apparatus of FIG. 1 taken along lines 2—2 where the same numbers are used to refer to the same parts in the two figures. The airbag system, shown generally at 100, contains of an airbag 110, an inflator assembly 120, a mounting plate 160 and a sensor assembly 140. The sensor assembly contains a rotatable sensing mass 141 and a cantilevered spring 142 which performs the dual purposes of biasing the sensing mass 141 toward its at rest position shown in FIG. 2 and also providing the energy to the firing pin 143 required to initiate the stab primer 122 as further described below. The sensing mass contains a firing pin spring retaining portion 144 which engages the firing pin spring during the sensing time and releases it when the sensing mass has rotated through the sensing angle.

The sensing mass is connected to the sensor housing through a hinge 145. The sensor housing 101 is formed by the housing wall portions 146 and 148 and by top cover 150 and bottom cover 151 which may be the same part as the top cover 121 of the inflator assembly 120. The sensor housing is filled with air and sealed so to maintain a constant air density regardless of the ambient temperature or pressure. The sensor housing walls and sensing mass are preferably molded along with an inserted hinge 145 in a single insert molding operation to provide a careful control of the dimensions of the parts and particularly of the clearance 152 between the walls and the sensing mass 141 for the reasons described below.

The inflator assembly 120 consists of a stab primer 122, a propellant chamber 123 containing propellant 124 and a series of cooling and filtering screens 125. In the particular design shown in FIGS. 1 and 2, the stab primer 122 has been placed inside of the igniter housing 126, which is inside of the inflator housing formed by sections 121 and 129. A small orifice 127 has been left open for the firing pin 143 to enter and initiate the primer. The stab primer is from a family of the most sensitive stab primers requiring less than 25 in-oz of energy for activation. The standard M55 military detonator is a member of this class and has been manufactured in very large quantities during war time. For the purposes of this disclosure, the term primer will be used to represent both primers and detonators. The small orifice 127 will permit some gas to enter the sensor during the time that the propellant is burning and inflating the airbag but since its area is less than 1% of the area of the exit orifices 128 through which the generated gas enters the airbag, less than 5% of the generated gas will pass into the sensor. Naturally, a larger orifice could be used but in all cases the amount of gas which passes into the sensor will be less than 10% of the total gas generated. Since this gas will be hot, however, it will destroy the sensor and leak into the door. In another implementation discussed below, a through bulkhead initiation system is used to prevent any gas from passing into the sensor from the inflator.

During operation of the device, sensing mass 141 rotates relative to sensor housing 101 in the direction of the arrow under the influence of the acceleration with its motion being retarded by the biasing spring and the gas pressure forces. Upon a sufficient rotation, firing pin and biasing spring 142 are released and firing pin 143 moves to impact primer 122 which burns and ignites the igniter mix 130. The igniter mix, which is typically composed of boron potassium nitrate, then ignites the propellant 124 which burns and generates gas. The gas then flows through exit orifices 128 into the inflatable bag 110, inflating the bag.

In the implementation shown in FIGS. 1 and 2, the stab primer has been located in the center of the inflator housing. This is the conventional location for electrical primers in most driver's side inflator designs. The sensor is placed adjacent and in line with the inflator permitting the use of conventional inflator designs which minimize the size, complexity and weight of the inflator. The sensing mass is approximately of square shape and the sensor housing is made circular to mate with the inflator design.

In the particular design shown in FIGS. 1 and 2, a burning propellant inflator design was illustrated. Naturally, other propellant technologies such as a stored gas or hybrid (a combination of stored gas and propellant) could have been used without departing from the teachings of this invention.

Figure 3:
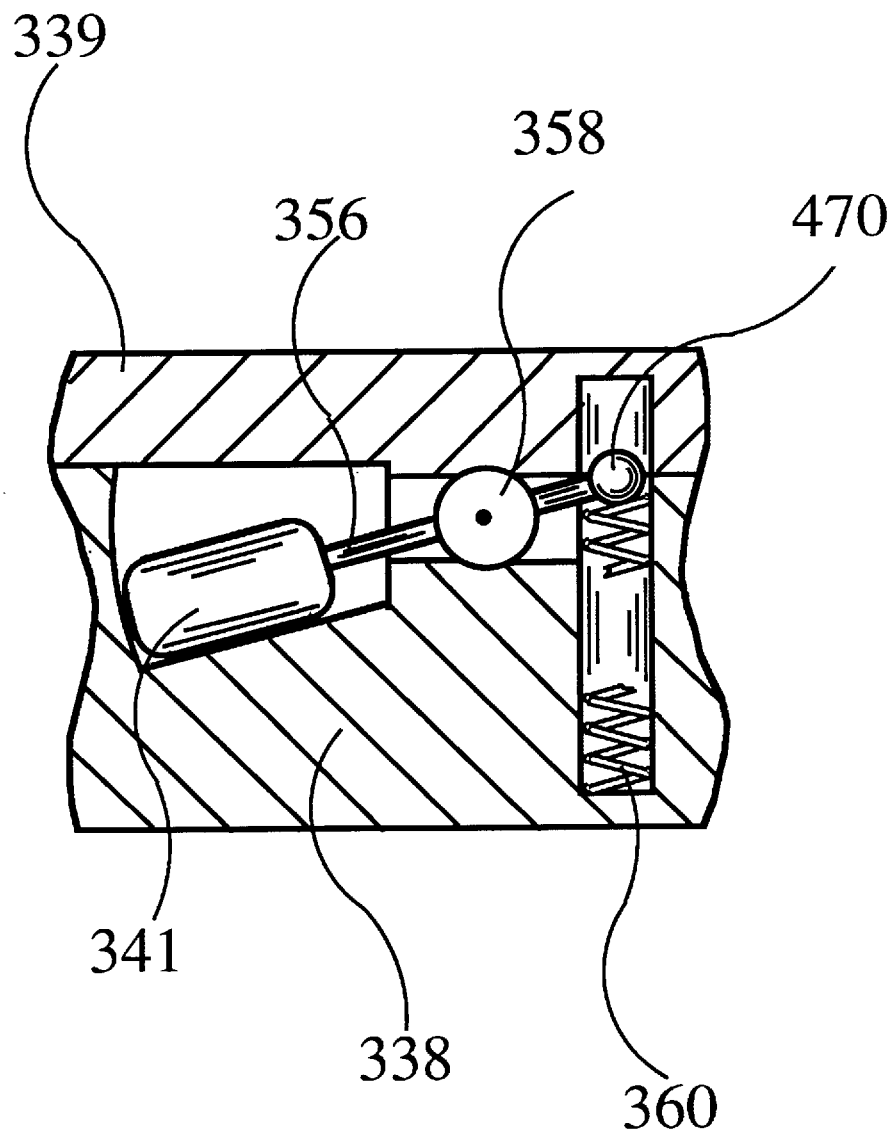
FIG. 3 is an enlarged fragmentary view of the sensing mass and attached lever arm extending from the D-shaft prior to rotation of the sensing mass incident to a crash as adapted to the all mechanical system of U.S. Pat. No. 4,580,810.
Figure 4:
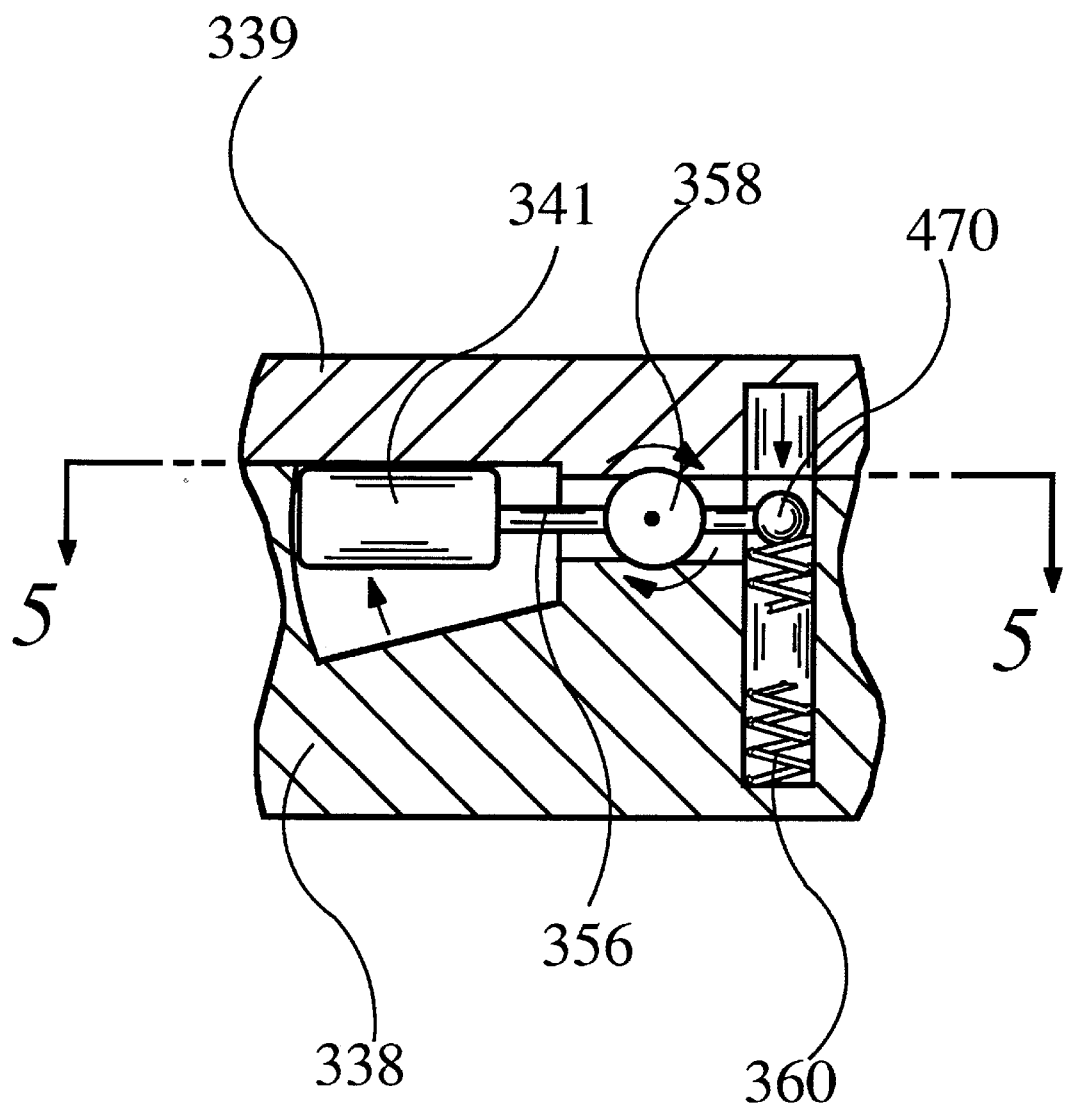
FIG. 4 is a similar view as FIG. 3 showing the sensing mass rotated as a result of a crash.
Figure 5:
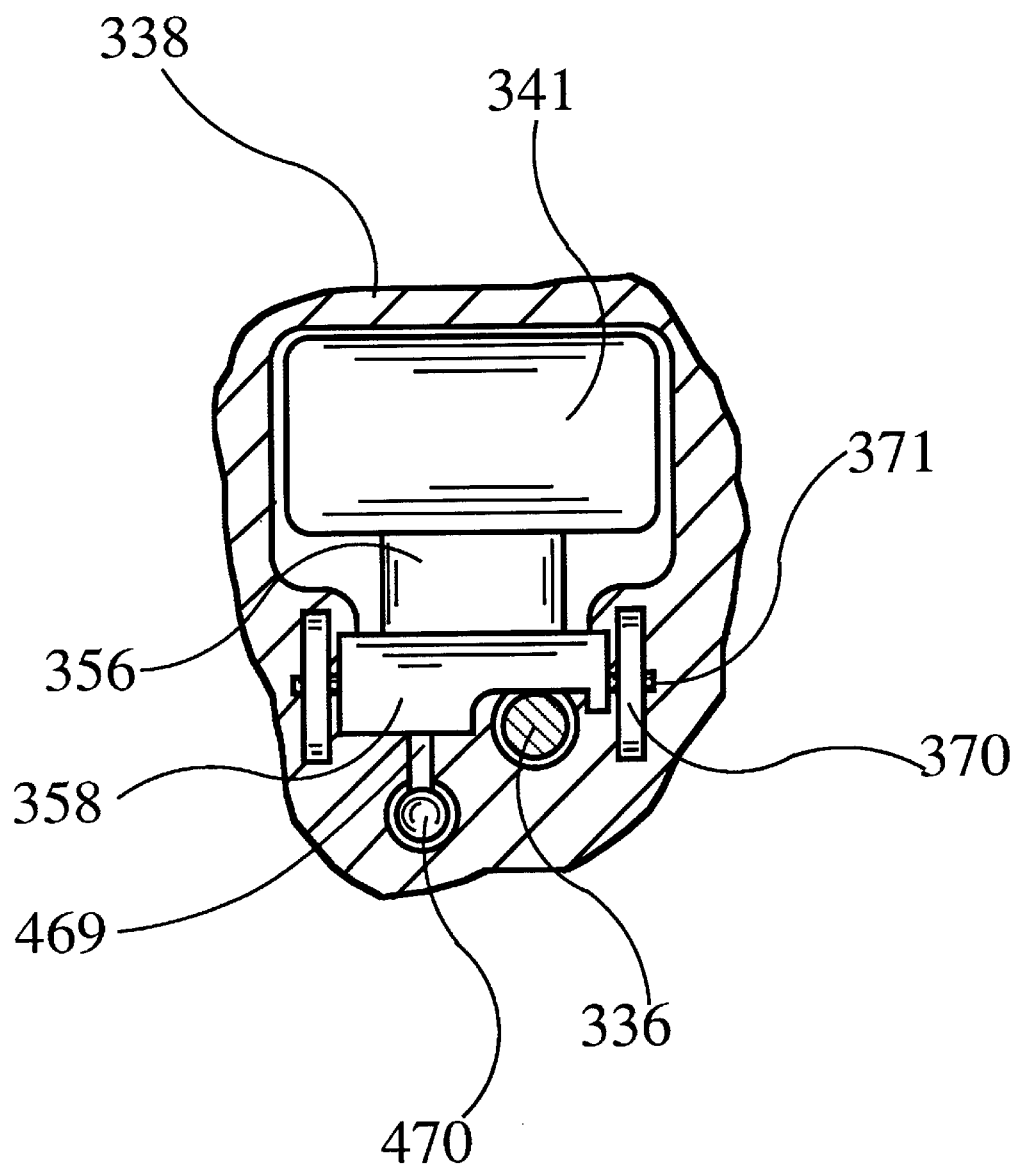
FIG. 5 is a view of the apparatus shown in FIG. 4 taken along lines 5—5.

FIG. 3 shows a fragmentary view of the sensing mass 341 and attached lever arm 356 extending from the D-shaft 358 prior to rotation of the sensing mass incident to a crash as adapted to the all mechanical system of Thuen U.S. Pat. No. 4,580,810 which is included herein by reference. This figure corresponds to FIG. 6 of the Thuen patent and shows the improved sensing mass design. FIG. 4 shows the same view as FIG. 3 with the sensing mass rotated, under the torque from spring 360 acting on ball 470, into the actuating position where it has released the firing pin to initiate deployment of the airbag. FIG. 4 corresponds to FIG. 7 in U.S. Pat. No. 4,580,810. FIG. 5 is a view taken along line 5—5 of FIG. 4 and shows the shape of the sensing mass 341. Like number references point to identical parts in FIGS. 3–5. Sensing mass 341 is retained in housing 338, by cover 339, and rotates with D-shaft 358. This rotation is facilitated by pivots 371, which form part of the D-shaft, and pivot plates 370. In this manner the sensing mass is hinged to the sensor housing permitting only rotational motion and rendering the sensor insensitive to the effects of cross-axis accelerations.

Figure 8:
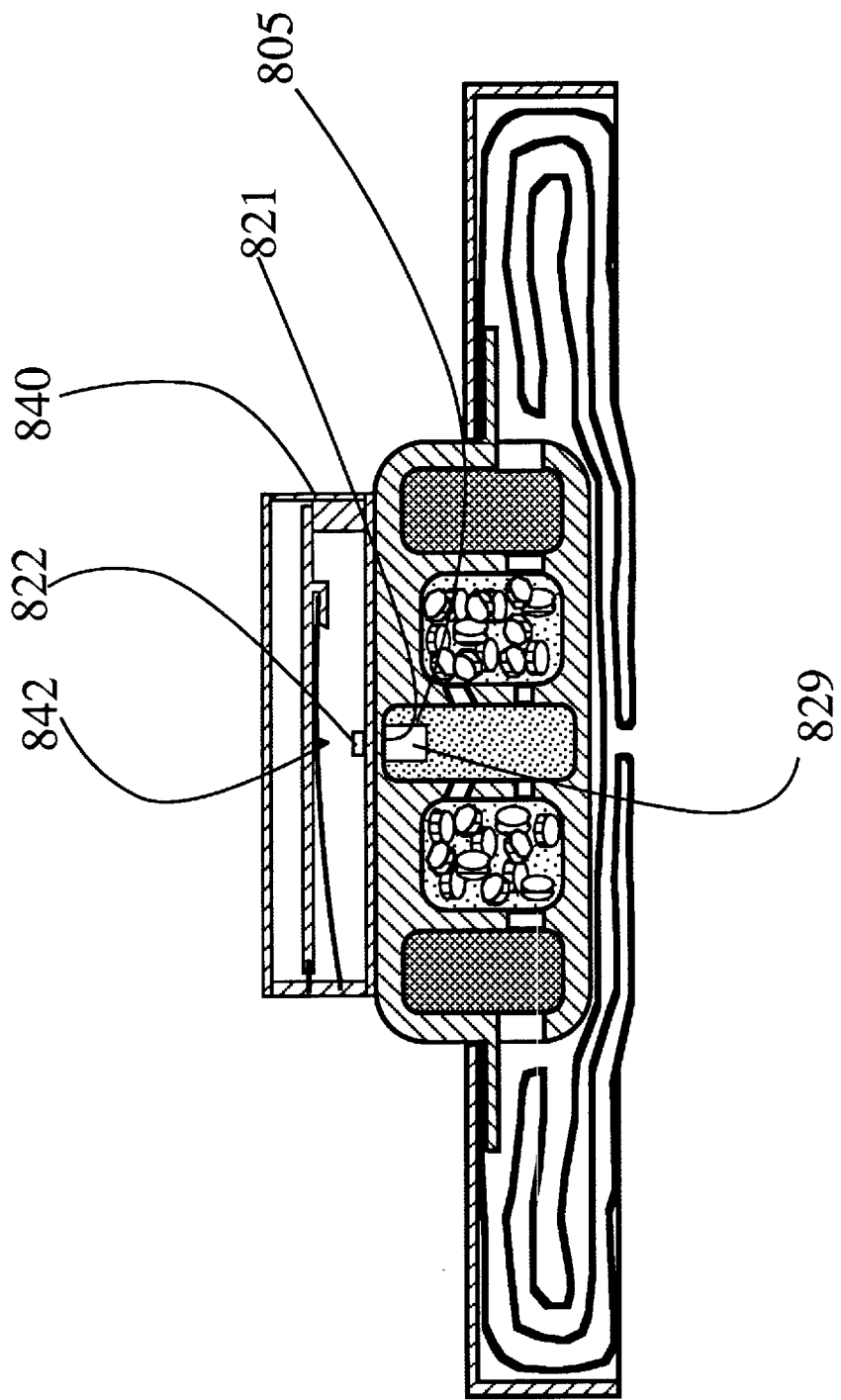
FIG. 8 is a cross section view of a through bulkhead initiation system adapted to a mechanical self contained airbag system.
Figure 9:
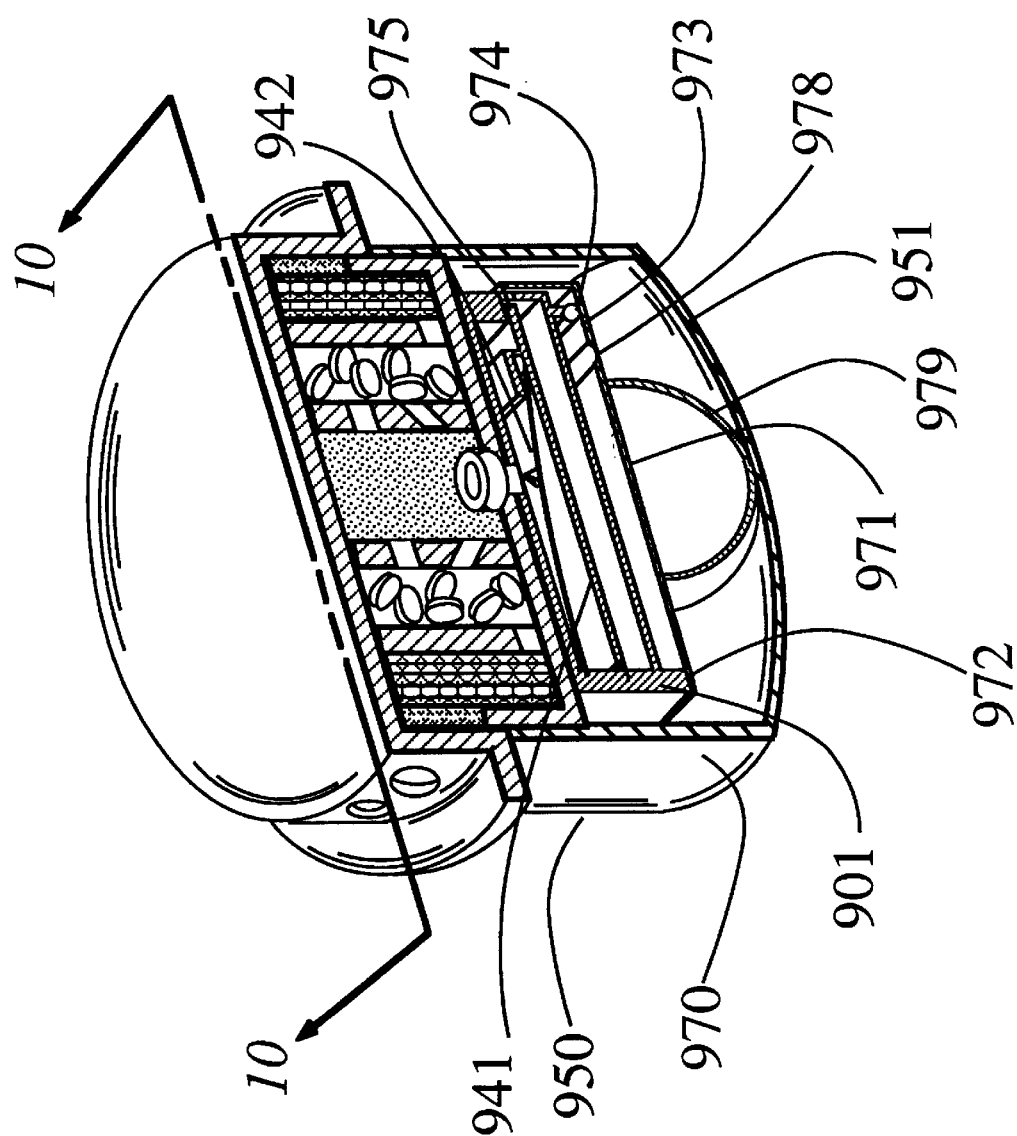
FIG. 9 is a perspective view of a mechanical self contained airbag system using a crush sensing arming system, shown in the state before a crash occurs.
Figure 9A:
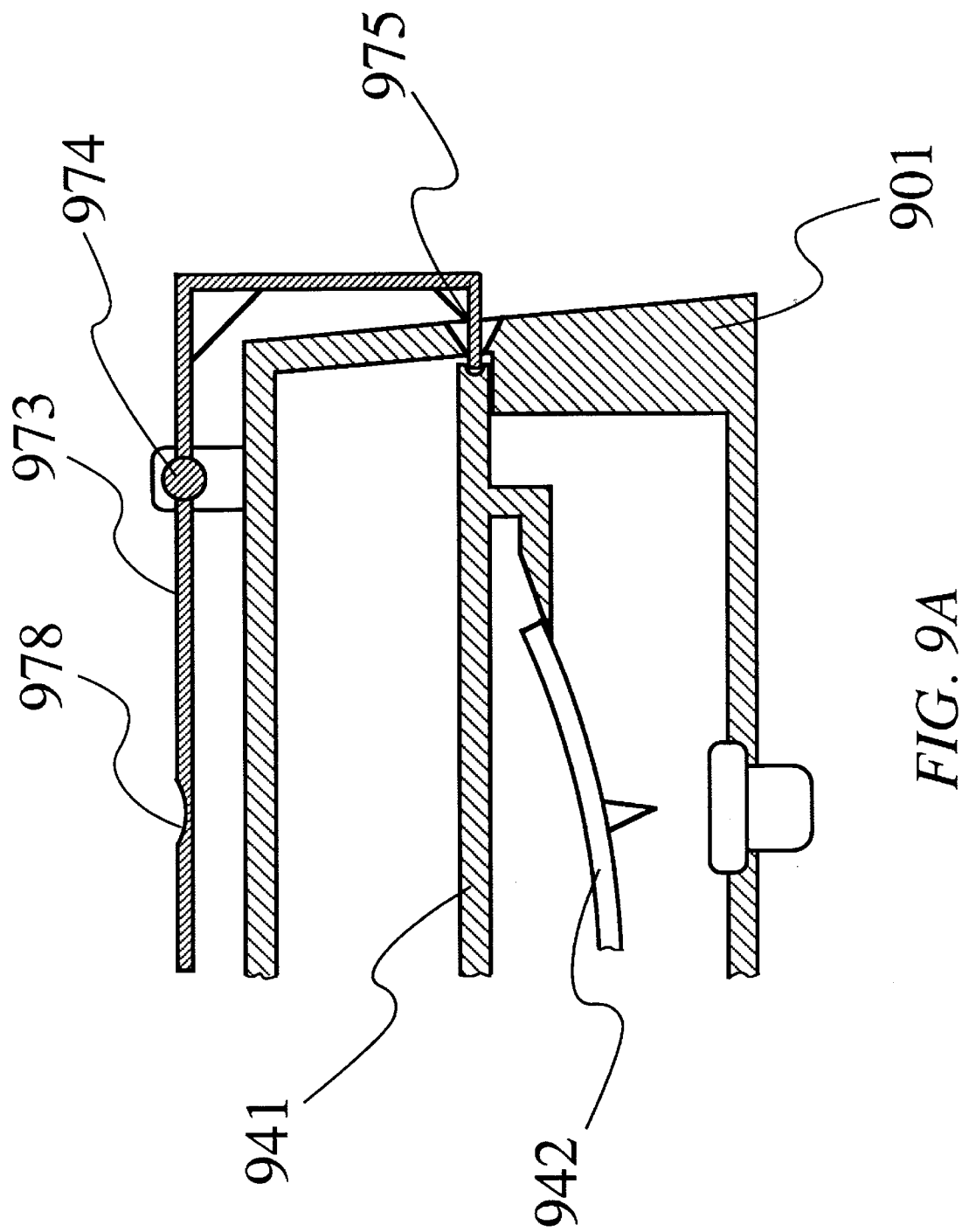
FIG. 9A is a blowup with certain parts removed showing a portion of the sensor shown in FIG. 9 in the unarmed position.

In this embodiment, mass 341, lever arm 356, ball 470, pin 469 and D-shaft 358 are all made as one part which reduces the cost of the assembly. Naturally they could be made as separate parts and assembled. When D-shaft 358 rotates through a sufficient angle, it releases firing pin 336 in the same manner as shown in FIGS. 8 and 9 of U.S. Pat. No. 4,580,810. The motion of the mass is undamped since the clearance between the mass 341 and housing 338 is sufficiently large so as to minimize the flow resistance of the air as the mass rotates. Naturally, in another implementation, the mass could be redesigned to have its motion damped by the flow of a gas in the manner shown in FIGS. 1 and 2 above. Also, two sensor systems of the type disclosed in FIGS. 3–5 can be used in the all mechanical system in a similar way as shown in U.S. Pat. No. 4,580,810.

Figure 6:
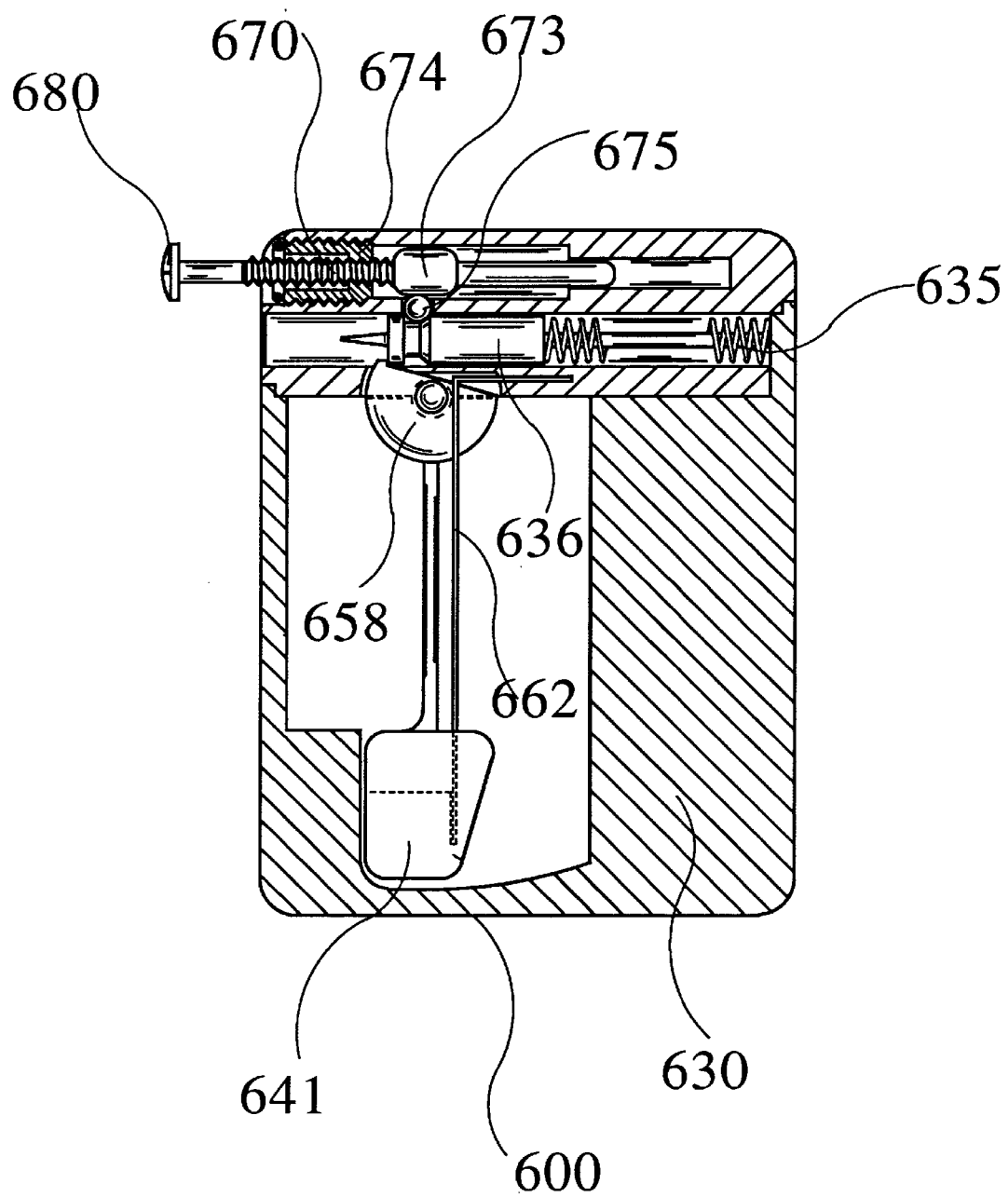
FIG. 6 is a cross section view of a sensor for use in an all mechanical system where the sensor is mounted outside of the inflator housing, shown in an unarmed or safe position prior to assembly with an inflator.
Figure 7:
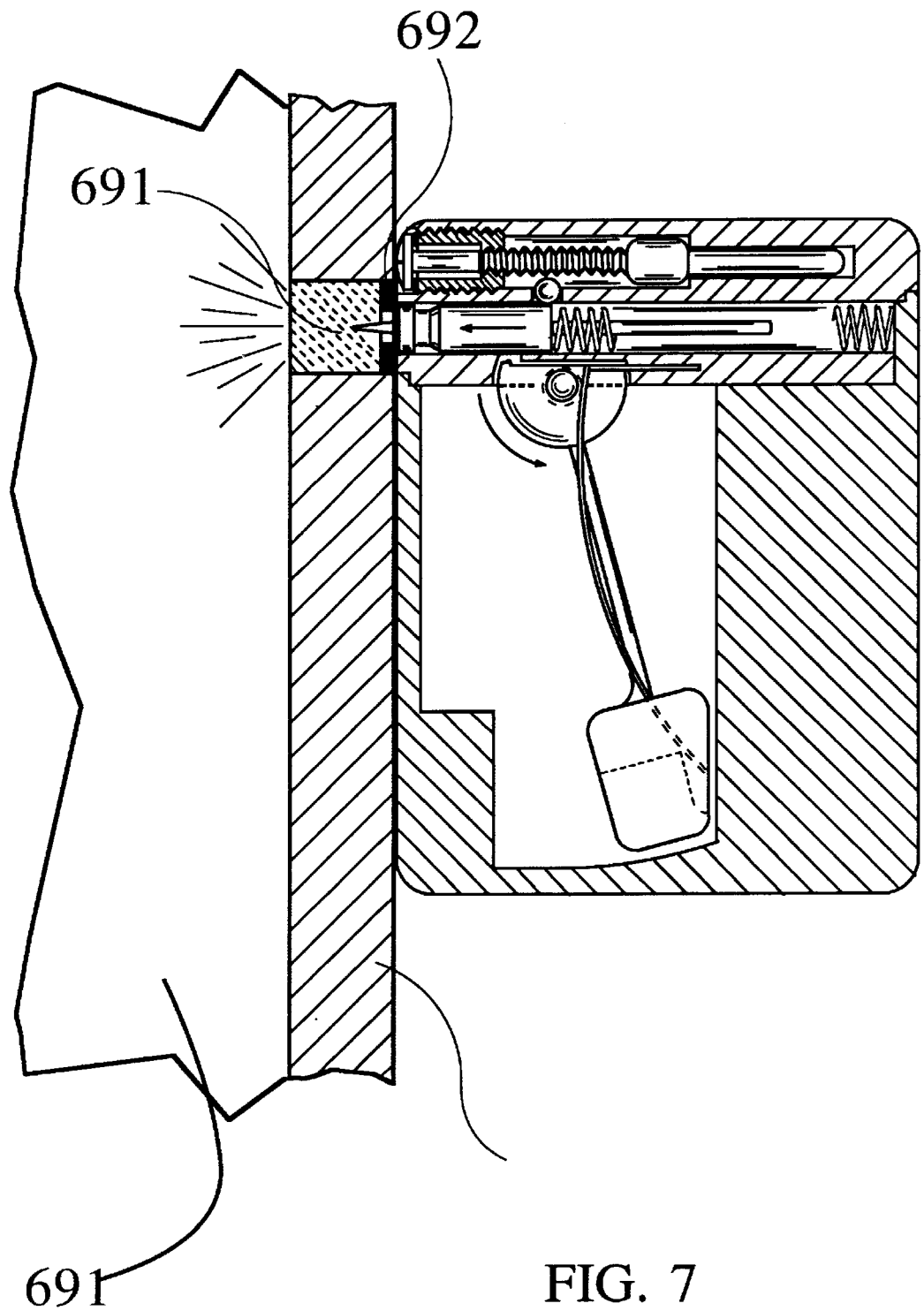
FIG. 7 is a cross section view of the sensor of FIG. 6 shown mounted on an inflator, shown in a fragmentary view, after it has triggered in response to a vehicle crash.

The all mechanical system as depicted in FIGS. 3–5 requires that a special inflator be designed to accommodate the sensor within its housing. There has already been a substantial investment in tooling and production facilities for electrically actuated inflators by several inflator manufacturers. Also, substantial reliability statistics have been accumulated on these inflator designs through the hundreds of millions of miles that airbag equipped vehicles have traveled. It is desirable to build on this base with new systems which can be done using the sensor designs of this invention as depicted in FIGS. 6 and 7. This sensor design is adapted to be attached to a standard electrical inflator design where a stab primer 691 is used in place of the electrically actuated squib normally used.

The sensor-initiator is shown generally as 600 in FIG. 6. In a similar manner as above, mass 641 rotates in sensor housing 630 during a crash against the force provided by cantilevered biasing spring 662 until the D-shaft 658 has rotated sufficiently to release firing pin 636. Once released, firing pin 636 is propelled by firing pin spring 635 and impacts primer 691 to initiate deployment of the airbag. A washer containing an orifice 692 is provided in the top of primer 691 to minimize the leakage of inflator gases from the inflator 690 while the propellant is burning. In this manner, the sensor does not have to be constructed of strong materials as discussed in the above referenced patent.

In one configuration of a self contained system, the sensor assembly and the airbag and inflator assembly are kept separate until mounted onto the vehicle. In this case the sensor is mounted using an appropriate apparatus (not shown) to the steering wheel after the wheel is mounted to the vehicle. Then the airbag module is assembled to the steering wheel. In this case the sensor is armed after it has been installed onto the vehicle through the use of arming screw arming screw 670. The inflator is only brought into contact with the sensor after the sensor has been mounted onto the vehicle, thus minimizing the chance of an inadvertent actuation prior to installation. To arm the sensor, arming screw 670 is rotated after the sensor is mounted onto the steering wheel causing it to move downward in its housing 674. This removes the retaining cylinder 673 from blocking the motion of locking ball 675 which removes a lock on the firing pin. As long as ball 675 remains locking the firing pin 636, rotation of the mass 641 will not release the firing pin and the sensor is unarmed. Additional apparatus, not shown, can be used to prevent the assembly and disassembly of the sensor from the steering wheel unless the arming screw 670 is in the unarmed position. Also, interference between the head 680 of the arming screw 670 and the surface 693 of the inflator 690 prevents assembly of the inflator and airbag module to the steering wheel until the sensor has been armed. Thus, in this very simple manner, an inexpensive all mechanical airbag system can be made using standard inflator designs with minor modifications.

In FIGS. 1 and 2, the primer was shown as part of the inflator assembly. In FIG. 8 a cross section view of a through bulkhead initiation system adapted to a mechanical self contained airbag system is illustrated. In this case, the stab primer 822 is instead part of the sensor assembly 840 and when the primer is initiated by the firing pin 842, it creates a shock on one side of the inflator housing wall 821 which is transmitted through the wall and interacts with a shock sensitive pyrotechnic mix 829 which has been placed into a cavity 805. This through bulkhead initiation system and the particular pyrotechnic mix formulation is well known to ordinance engineers where it has been applied to military devices. Such a system has not been used, however, in airbag systems. In this manner, a hole is not opened between the sensor assembly and the inflator assembly and the gas is prevented from leaking into the sensor assembly.

In FIG. 9 a perspective view of a mechanical self contained airbag system using a crush sensing arming system 950 is shown in the state before a crash occurs. In this implementation the sensor is armed when the vehicle door skin, or side skin, is crushed to where it impacts the a curved impact plate, not shown, which then impacts the sensor can 970 and displaces outer cover 951 relative to the sensor housing 901. The sensor crush sensing outer cover 951 has a slight spherical shape so that it oil-cans downward pressing on lever 971 through pusher member 979. Lever 971 then rotates about its attachment point 972 to the sensor housing and causing lever 973 to also rotate about its pivot point 974 on the sensor housing by virtue of hinge 978. The rotation of lever 973 causes the end 975 of lever 973 to pull out of the sensor housing where it was detenting the sensing mass 941 and preventing it from rotating to the degree necessary to release the firing pin spring 942. Thus until the sensor experiences a crushing force from the crash, the airbag system cannot deploy.

Levers 971 and 973 are joined together by hinge 978 and can be made from a single piece of material. In this case the hinge would be formed either by a coining or stamping operation or by a milling operation. Naturally, the two levers need not be joined together.

This provides a sensor system which requires the occurrence of two environments which are always present in a crash, crush and velocity change. The crush sensing outer cover 951 is designed to respond and arm the sensor when impacted from any reasonable direction by an impact plate not shown which is likely to occur in a crash. For many vehicles, the crush may not reach the sensor at the time that deployment is required. In the case where two systems are used on each side of the vehicle, for example, and an impact occurs at the A-pillar, the rear seat system may not experience crush in time. The arming system shown in FIG. 9 could still be used where the arming would occur when the system is mounted onto the vehicle instead of when the crash occurs. In this case the curved impact plate would not be necessary and the deflection of the sensor cover would occur either during the mounting process or by a separate operation after the system is mounted.

Figure 10:
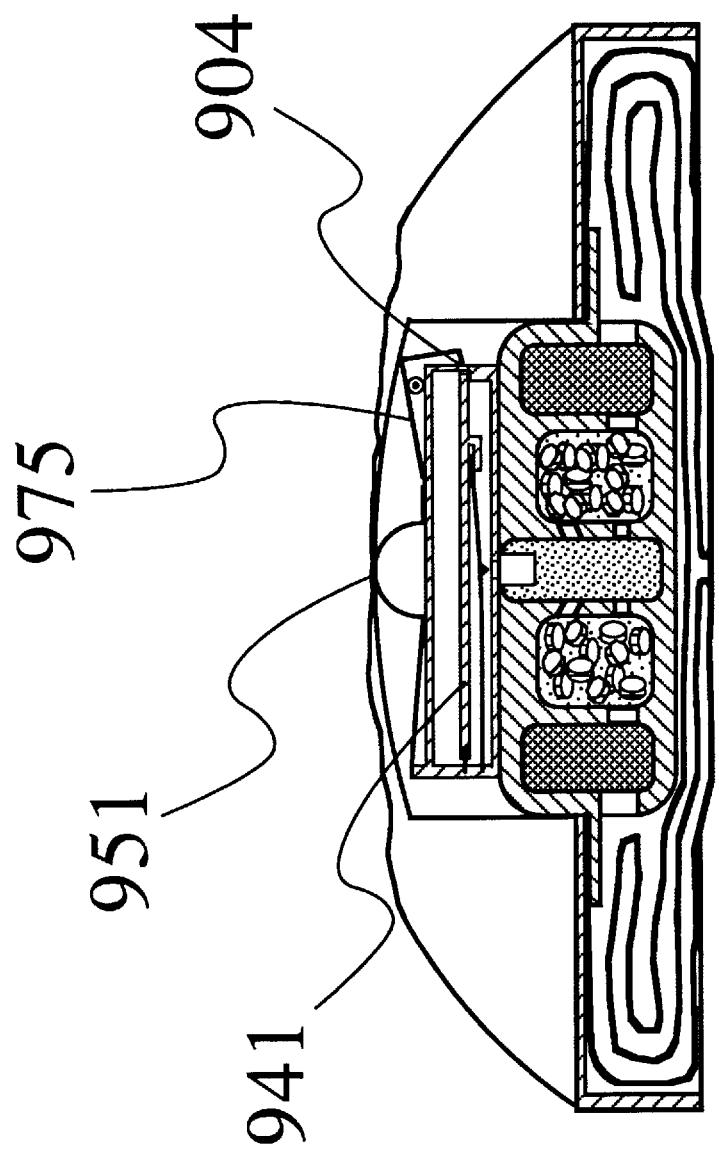
FIG. 10 is a cross section view of the apparatus of FIG. 9 taken along lines 10—10 showing the crush sensing arming system after it has been activated by vehicle crush but before the sensing mass of the discriminating sensor has begun to move.
Figure 11:
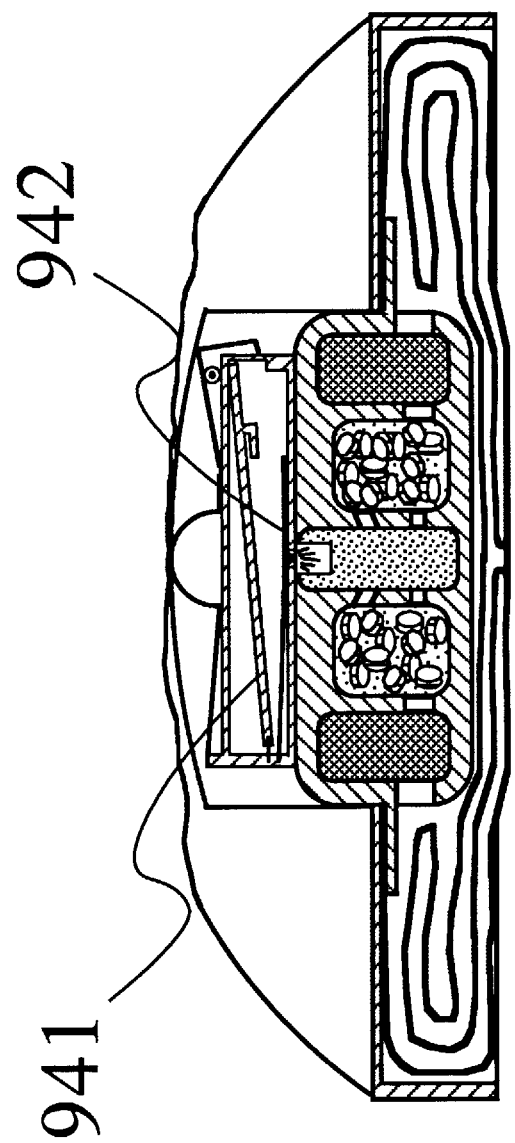
FIG. 11 is a cross section view of the apparatus of FIG. 9, also taken along lines 10—10, showing the crush sensing arming system after it has been activated by vehicle crush and showing the sensing mass of the discriminating sensor after it has moved and released the firing pin, triggering the inflation of the airbag.
Figure 11A:
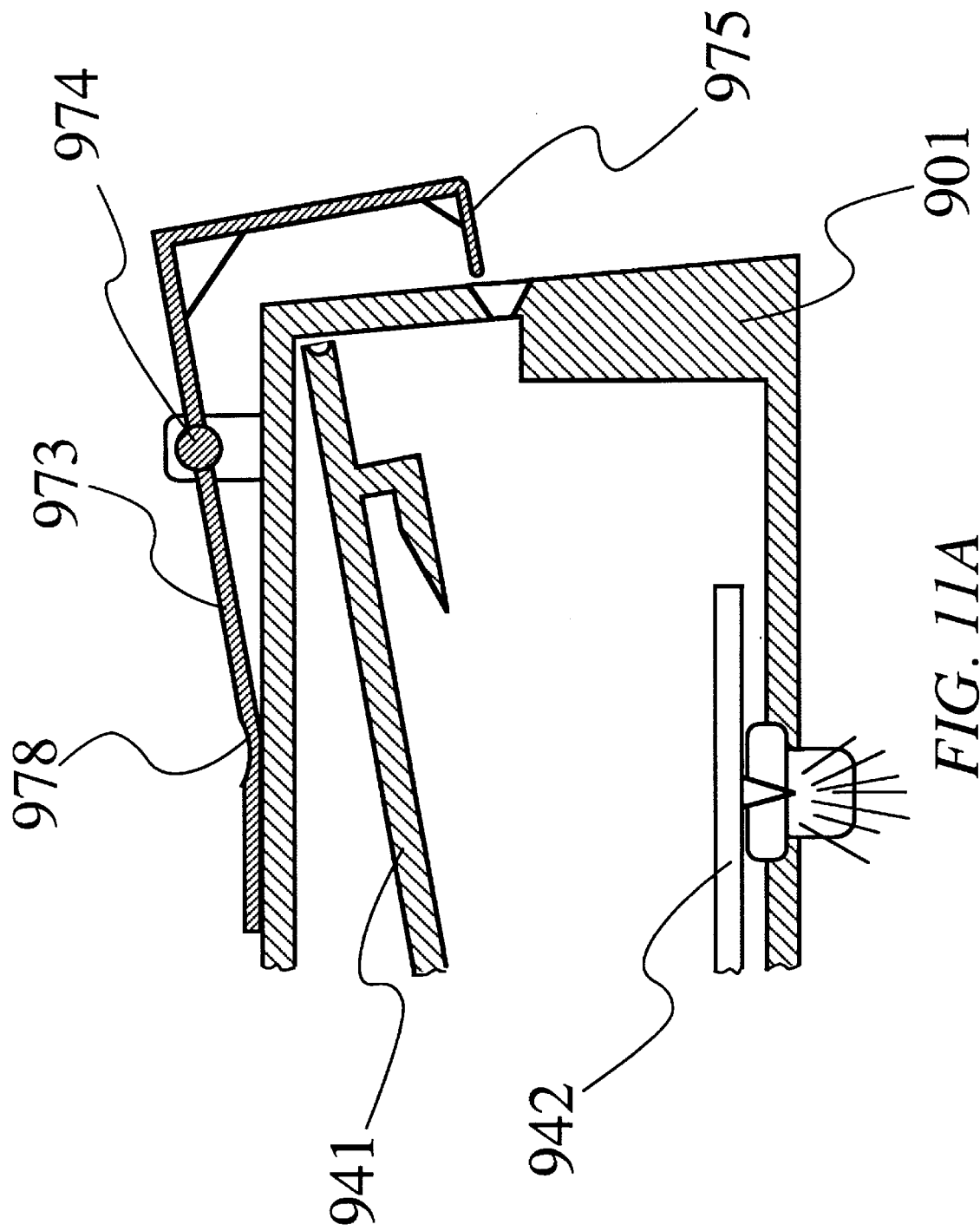
FIG. 11A is a blowup with certain parts removed showing portion of the sensor shown in FIG. 11 in the fired position.

FIG. 10 is a cross section view of the apparatus of FIG. 9 taken along lines 10—10 showing the crush sensing outer cover 951 and lever system after end 975 has moved out of hole 904 by vehicle crush but before the sensing mass 941 of the discriminating sensor has begun to move. FIG. 11 is a similar view of the apparatus of FIG. 10 additionally showing the sensing mass 941 of the discriminating sensor after it has moved and released firing pin 942, triggering the inflation of the airbag.

The motion of the sensing mass 941 is damped by the requirement that air must flow between the sensing mass and the housing in the manner described in more detain in co-pending patent application Ser. No. 07/896,496 referenced above. Naturally, other damping methods such as magnetic damping could also be used.

In the case of FIG. 9, the sensor is entirely surrounded by a metal can 970 which is formed by a drawing process. The sensor can is attached to the inflator using structural adhesive 990 such as a urethane or epoxy compound. In this manner the sensor is hermetically sealed.

The term hermetic seal as used herein means a seal which will not permit the passage of any significant amount of moisture or other contaminants into the interior of the self contained airbag module and further will not permit the passage of gas into or out of the sensor housing of sufficient quantity as to change the gas density by more than 5% at any time over the life of the vehicle. Each vehicle manufacturer has an accelerated life test which can be used along with appropriate sensor testing equipment to test the sensor seals according to this definition. Typical O-ring seals are not hermetic by this definition however properly designed plastic and metal welded seals and epoxy and urethane seals are hermetic.

Figure 12:
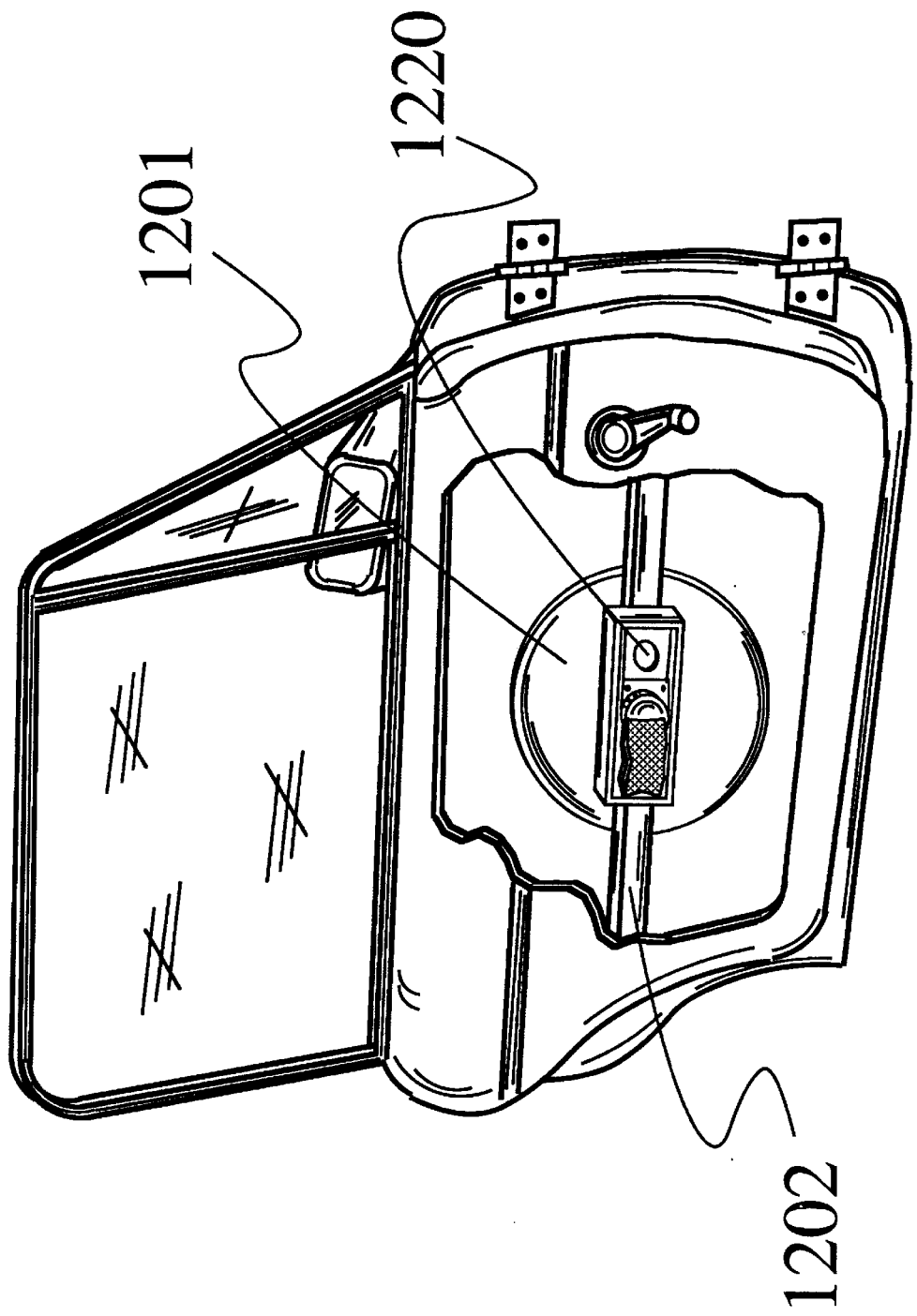
FIG. 12 is a perspective view of a side impact airbag system illustrating the placement of the airbag vents in the door panel and the exhausting of the inflator gases into the vehicle door and also showing the use of a pusher plate to adjust for the mismatch between the point of impact of an intruding vehicle and the sensor of a self contained side impact airbag system.

FIG. 12 is a perspective view of a side impact airbag system illustrating the placement of the airbag vents in the door panel and the exhausting of the inflator gases into the vehicle door and also showing the use of a pusher plate 1201 to adjust for the mismatch between the point of impact of an intruding vehicle and the sensor of a self contained side impact airbag system. The pusher plate 1201 is shown attached to the main structural door beam 1202 in this illustration but other mounting systems are also possible. During a side impact to any portion of the side of the vehicle which is likely to cause intrusion into the passenger compartment and contact an occupant, the pusher plate will remain in a substantially undistorted form until it has impacted with the sensor causing the sensor to begin deployment of the airbag. In this implementation a non-sodium azide propellant, such as nitro-cellulose, is used and the gas is exhausted into the door though a pair of orifices 1220.

Figure 13:
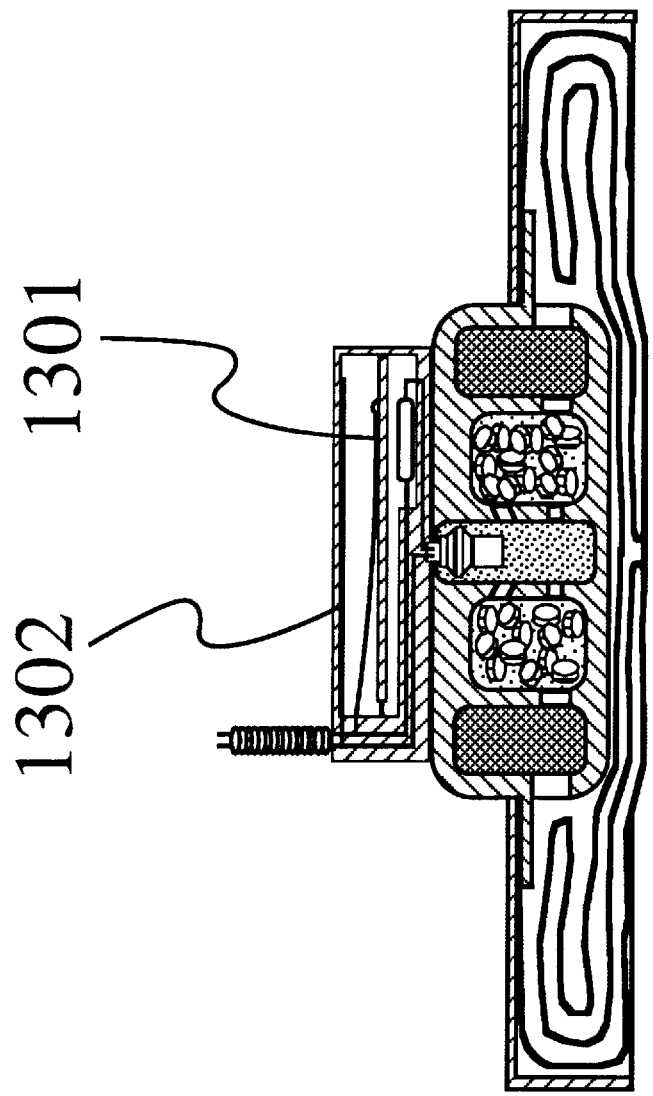
FIG. 13 is a cross section view of a self contained side impact airbag system using an electro-mechanical sensor.

FIG. 13 is a cross section view of a self contained side impact airbag system using an electro-mechanical sensor. An electro-mechanical sensor is one in which the sensing is accomplished through the motion of a sensing mass from a first at rest position to a second activating position at which point an event happens which typically involves the closing of a switch by mechanical or magnetic means. In FIG. 13, biasing spring contact 1301 is caused to engage contact 1302 when the sensor experiences a crash as described above.

Figure 14:
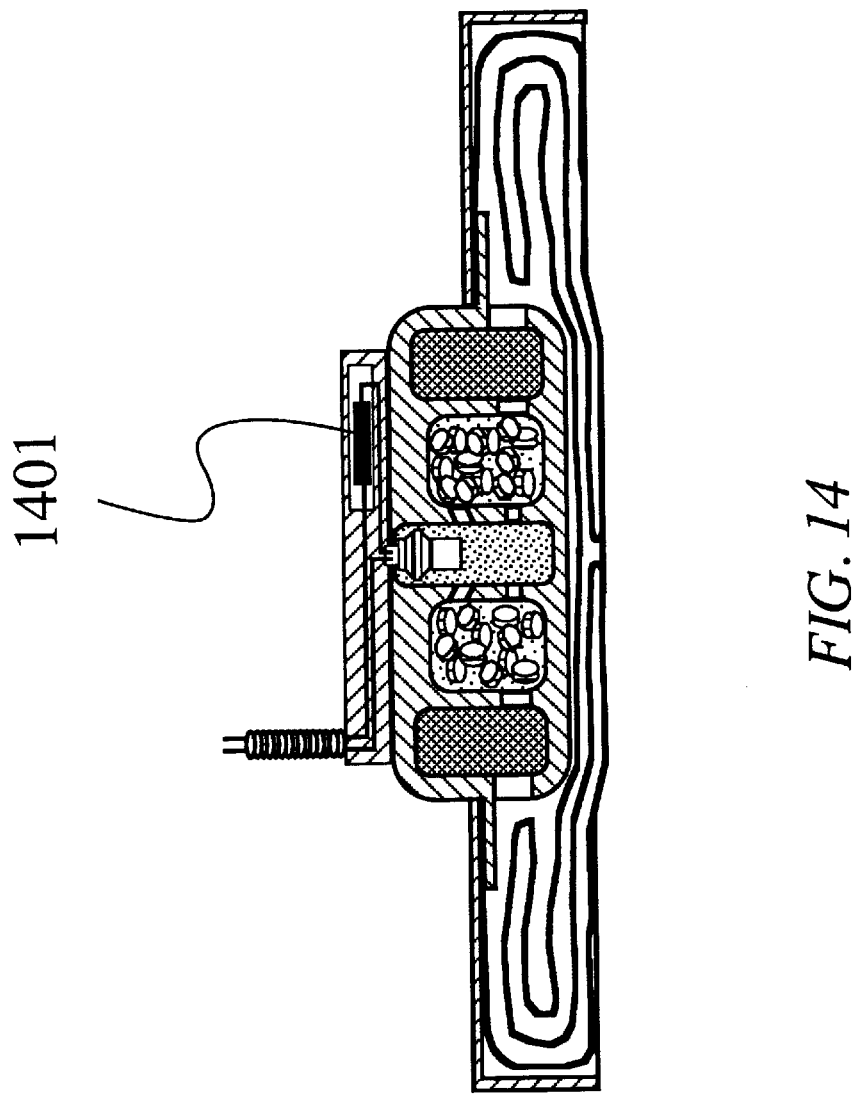
FIG. 14 is a cross section view of a self contained side impact airbag system using an electronic sensor.

FIG. 14 is a cross section view of a self contained side impact airbag system using an electronic sensor. An electronic sensor is one in which the motion of the sensing mass is typically continuously monitored with the signal electronically amplified with the output fed into an electronic circuit which is usually a micro-processor. Electronic sensors typically use accelerometers use accelerometers which are usually make use of strain gage or piezo-electric elements shown here as 1401. Modern accelerometers are sometimes micro-machined and combined with other elements on an electronic chip. In electromechanical sensors, the motion of the sensing mass is typically measured in millimeters and is much larger than the motion of the sensing mass in electronic sensors where the motion is frequently measured in microns.

When the term electrical is used herein it is meant to include both electro-mechanical and electronic systems.

Figure 15:
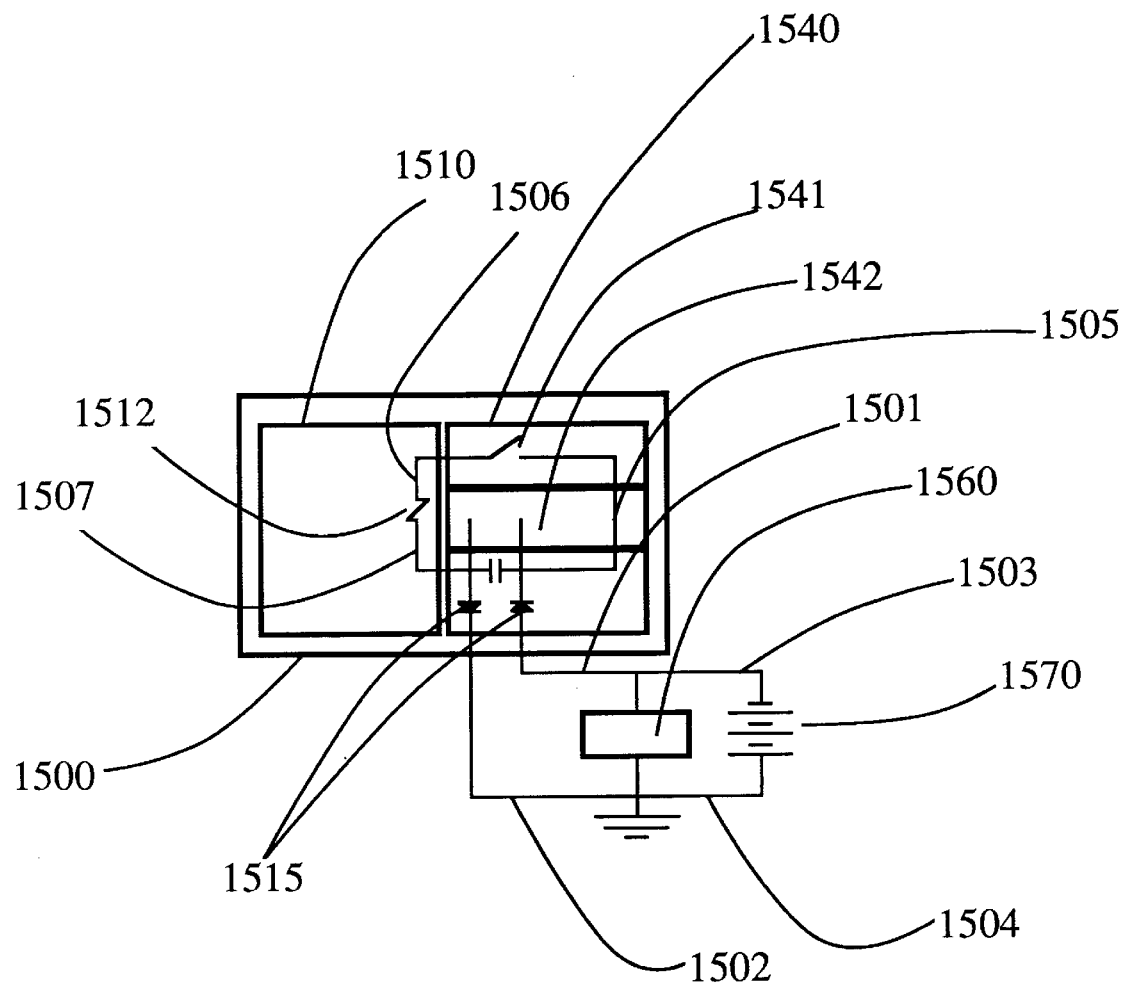
FIG. 15 is a schematic of the electric circuit of an electro-mechanical or electronic self contained side impact airbag system.

FIG. 15 is a schematic of the electric circuit of an electromechanical or electronic self contained side impact airbag system. The self contained module shown generally at 1500 contains a sensor assembly 1540 and an airbag and inflator assembly 1510. The sensor assembly contains a sensor 1541, a diagnostic module 1542, an energy storage capacitor 1543, and a pair of diodes 1515 to prevent accidental discharge of the capacitor if a wire becomes shorted. The module is electrically connected to a diagnostic monitoring circuit 1560 by wire 1501 and to the vehicle battery by wire 1503. It is also connected to the vehicle ground by wire 1502. The sensor, diagnostic and capacitor power supply are connected to the squib by wires 1505 through 1507.

In the simplest configuration, the diagnostic monitoring circuit 1560 checks that there is sufficient voltage on the capacitor to initiate the inflator in the event of an accident, for example, and either of wires 1501, 1502, 1503 or 1504 are severed. In this case the diagnostic internal to the self contained module would not be necessary. In more sophisticated cases, the diagnostic 1542 could check that the squib resistance was within tolerance, that the sensor calibration was correct (through self testing) and that the arming sensor has not inadvertently closed. It could also be used to record that the arming sensor, discriminating sensor and airbag deployment all occurred in the proper sequence and record this and other information for future investigative purposes. In the event of a malfunction, the diagnostic unit could send a signal to the monitoring circuitry which may be no more than an indication that the capacitor was not at full charge.

A substantial improvement in the reliability of the system is achieved by placing the diagnostic module and backup power supply within the self contained airbag system particularly in the case of side impacts where the impact can take place at any location over a wide area. An impact into a narrow pole at the hinge pillar, for example, might be sufficient to sever the wire from the airbag module to the vehicle power source before the sensor has detected the accident.

Most of the advantages of placing the sensor, diagnostic and backup power supply within the self contained module can of course be obtained if one or more of these components are placed in a second module in close proximity to the self contained module. For the purposes of electromechanical or electronic self contained modules, therefore, as used herein, the terms "self contained module" or "self contained airbag system" will include those cases where one or more of the components including the sensor, diagnostic and backup power supply are separate from the airbag module but in close proximity to it. For example, in the case of steering wheel mounted systems, the sensor and backup power supply would be mounted on the steering wheel and in the case of side impact door mounted systems, they would be mounted within the door. In conventional electrical or electronic systems, on the other hand, the sensor, diagnostic module and backup power supply are mounted remote from the airbag module in a convenient location typically centrally in the passenger compartment such as on the tunnel, under the seat or in the instrument panel.

With the placement of the backup power supply in the self contained module, greater wiring freedom is permitted. For example, in some cases for steering wheel mounted systems, the power can be obtained through the standard horn slip ring system eliminating the requirement of the ribbon coil now used on all conventional driver airbag systems. For side impact installations, the power to charge the backup power supply could come from any convenient source such as the power window or door lock circuits. The very low resistance and thus high quality circuits and connectors now used in airbag systems are not required since even an intermittent or high resistance power source would be sufficient to charge the capacitor and the existence of the charge is diagnosed as described above.

In this disclosure, the terms capacitor, power supply and backup power supply have been used interchangeably. Also, other energy storage devices such as a rechargeable battery could be used instead of a capacitor. For the purposes of this disclosure and the appended claims, therefore, the word capacitor will be used to mean any device capable of storing electrical energy for the purposes of supplying energy to initiate an inflator. Initiation of an inflator will mean any process by which the filling of an airbag with gas is started. The inflator may be either pure pyrotechnic, stored gas or hybrid or any other device which provides gas to inflate an airbag.

Figure 16:
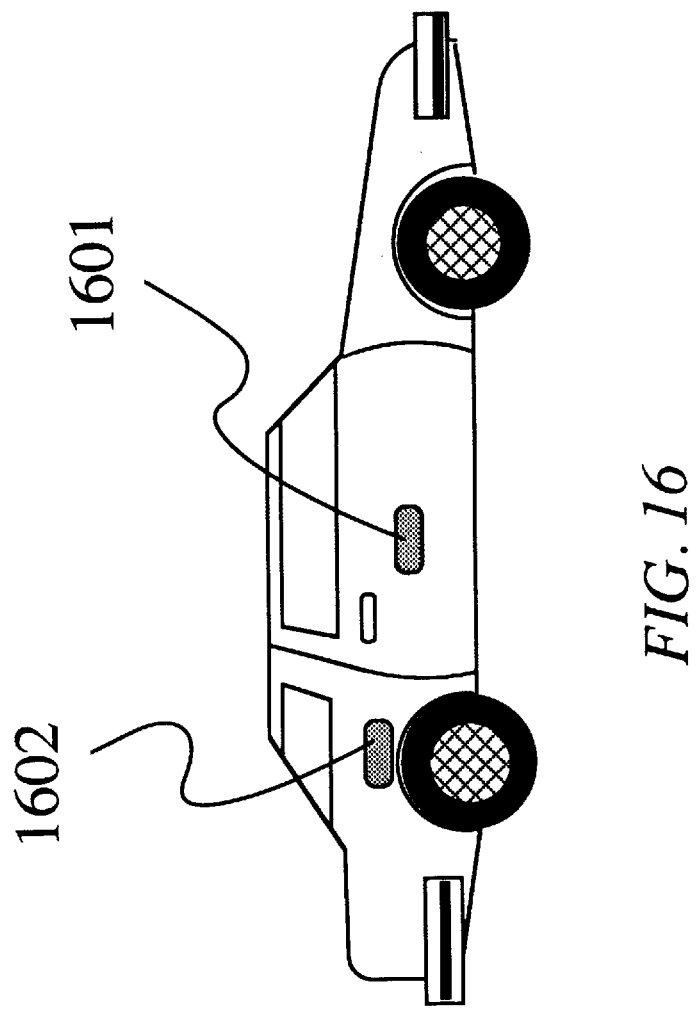
FIG. 16 is a side view of a vehicle showing the preferred mounting of two self contained airbag modules into the side of a coupe vehicle, one inside of the door for the driver and the other between the inner and outer side panels for the rear seat passenger.

FIG. 16 is a side view showing the preferred mounting of two self contained airbag modules 1601 and 1602 into the side on a two door vehicle. Module 1601 is mounted inside of a door while module 1602 is mounted between the inner and outer side panels to protect a rear seated occupant. Each of the modules has its own sensor and, in the case of electrical self contained systems, its own capacitor power supply and diagnostic circuit.

Although several preferred embodiments are illustrated and described above, there are possible combinations using other geometries, materials and different dimensions for the components that can perform the same function. For example, the biasing spring need not be the same as the biasing spring in the case of the implementation shown in FIG. 1 and a magnet might be used in place of a biasing spring for several of the mechanical cases illustrated. Therefore, this invention is not limited to the above embodiments and should be determined by the following claims.

What is claimed is:

1. A side impact self-contained airbag system for a vehicle having front and rear wheels, said airbag system comprising:
   (i) an airbag subsystem, said subsystem comprising:
      (a) a sensor housing having at least one side wall, a top, and a bottom;
      (b) a mass within said sensor housing movable relative to said housing in response to accelerations of said sensor housing, said mass attached to one side wall by a hinge, said mass further comprising a catch;
      (c) a releasable firing pin; said catch comprising means to retain said firing pin;
      (d) an airbag; and
      (e) inflator means initiated by said firing pin for inflating said airbag; and
   (ii) means for mounting said airbag subsystem onto at least one of a side door of the vehicle and a side of the vehicle between the centers of the front and rear wheels, in such a position and direction as to sense an impact into the side of said vehicle;
      and wherein upon said side impact causing acceleration of said sensor housing in excess of a predetermined threshold, said mass moves about said hinge a certain distance sufficient to cause said catch to move a second certain distance sufficient to cause release of said releasable firing pin, and thus initiating said inflator means to inflate said airbag.

2. The invention in accordance with claim 1 wherein said catch engages said releasable firing pin.

3. A side impact self-contained airbag system for a vehicle having front and rear wheels, said airbag system comprising:
   (a) a sensor housing having at least one side wall, a top and a bottom;
   (b) a mass within said sensor housing movable relative to said housing in response to accelerations of said sensor housing, said mass attached to one side wall by a hinge;
   (c) a releasable firing pin;
   (d) a spring having two ends, one end of which is attached to said housing, said spring engaging said releasable firing pin, said spring providing a certain biasing force on said sensing mass;
   (e) an airbag;
   (f) inflator means initiated by said firing pin for inflating said airbag;
   (g) means for mounting said airbag system onto at least one side door of the vehicle and a side of the vehicle between the centers of the front and rear wheels, in such a position and direction as to sense an impact into the side of said vehicle;
   and wherein
      upon said side impact causing acceleration of said sensor housing in excess of a predetermined threshold, said mass moves about said hinge a certain distance sufficient to cause release of said releasable firing pin, and thus initiating said inflator means to inflate said airbag.

4. A side impact self-contained airbag system for a vehicle having front and rear wheels, said airbag system comprising:
   (a) a sensor housing having at least one side wall, a top, and a bottom;
   (b) a mass within said sensor housing movable relative to said housing in response to accelerations of said sensor housing, said mass attached to one side wall by a hinge, said mass having a catch;
   (c) a biased spring having two ends, one end of which is attached to said housing and the other end entered into said catch, said spring having a firing pin thereon, said spring having a certain bias; said catch comprising means to retain said firing pin;
   (d) an airbag;
   (e) inflator means for inflating said airbag initiated by said firing pin contacting said bottom;
   (f) means for mounting said airbag system onto at least one of a side door of the vehicle and a side of the vehicle between the centers of the front and rear wheels, in such a position and direction as to sense an impact into the side of said vehicle;
   and wherein
      upon said side impact causing acceleration of said sensor housing in excess of a predetermined threshold, said mass moves about said hinge a certain distance sufficient to cause said catch to disengage said other end of said spring,
      said bias of said spring causing said disengaged spring to move toward said bottom such that said firing pin is released and thus initiating said inflator means to inflate said airbag.

* * * * *

UNITED STATES PATENT AND TRADEMARK OFFICE
CERTIFICATE OF CORRECTION

PATENT NO.    : 5,842,716
DATED         : December 1, 1998
INVENTOR(S)   : David S. Breed It is certified that error appears in the above-identified patent and that said Letters Patent is hereby corrected as shown below:

<u>Title page,</u>
Delete item [63] in its entirety.

<u>Column 1,</u>
Lines 3-18, delete in their entirety.

Signed and Sealed this

Twenty-fourth Day of September, 2002

Attest:

JAMES E. ROGAN
Attesting Officer            Director of the United States Patent and Trademark Office